(12) United States Patent
Wilkinson

(10) Patent No.: US 8,694,541 B1
(45) Date of Patent: *Apr. 8, 2014

(54) MAPPING BUSINESS QUESTIONS TO SOURCE SYSTEM DATA ELEMENTS

(75) Inventor: John Wilkinson, Gibsonia, PA (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 474 days.

This patent is subject to a terminal disclaimer.

(21) Appl. No.: 12/896,099

(22) Filed: Oct. 1, 2010

(51) Int. Cl.
*G06F 7/00* (2006.01)
*G06F 17/00* (2006.01)

(52) U.S. Cl.
USPC .......................................................... 707/778

(58) Field of Classification Search
None
See application file for complete search history.

(56) References Cited

U.S. PATENT DOCUMENTS

| | | | |
|---|---|---|---|
| 5,706,506 A | 1/1998 | Jensen et al. | |
| 5,832,496 A | 11/1998 | Anand et al. | |
| 6,208,987 B1 * | 3/2001 | Nihei | 1/1 |
| 6,370,549 B1 * | 4/2002 | Saxton | 1/1 |
| 6,505,183 B1 * | 1/2003 | Loofbourrow et al. | 706/45 |
| 7,558,785 B2 * | 7/2009 | Dettinger et al. | 1/1 |
| 2005/0246393 A1 * | 11/2005 | Coates et al. | 707/200 |
| 2006/0041458 A1 | 2/2006 | Ringrose et al. | |
| 2006/0235857 A1 * | 10/2006 | Sauls et al. | 707/100 |
| 2009/0077033 A1 * | 3/2009 | McGary et al. | 707/3 |
| 2010/0169266 A1 * | 7/2010 | Bishop | 707/602 |
| 2011/0184939 A1 * | 7/2011 | Elliott | 707/722 |

OTHER PUBLICATIONS

U.S. Appl. No. 12/898,089, filed Oct. 1, 2010.

* cited by examiner

*Primary Examiner* — Azam Cheema
(74) *Attorney, Agent, or Firm* — Buchanan Ingersoll & Rooney PC; Robert J. Pugh

(57) ABSTRACT

Various embodiments of the invention can be used to organize and prioritize data to optimize the ability to answer business questions and address business needs. A data mapping system may be used to map value driver data elements to business questions to assess which data sets or sources of data are more important than others when assessing the business questions. This can assist in the process of identifying the most useful and accurate data for assessing a business question.

14 Claims, 22 Drawing Sheets

| ID | Level 1 | Level 2 | Level 3 | Level 4 | Level 5 |
|---|---|---|---|---|---|
| | | | | | 410 |
| | | 404 | 406 | 408 | |
| 654 | Improve Recruiting effectiveness | Sourcing | Forecasting | Market Growth | |
| 655 | Improve Recruiting effectiveness | Sourcing | Forecasting | Skill gaps | |
| 656 | Improve Recruiting effectiveness | Sourcing | Forecasting | Diversity needs | |
| 657 | Improve Recruiting effectiveness | Sourcing | Replacement needs | Attrition | |
| 658 | Improve Recruiting effectiveness | Sourcing | Replacement needs | Ramp time of replacements | |
| 659 | Improve Recruiting effectiveness | Sourcing | Internal hire opportunities | Promotions | |
| 660 | Improve Recruiting effectiveness | Sourcing | Internal hire opportunities | Transfers | |
| 661 | Improve Recruiting effectiveness | Sourcing | External hire opportunities | Campus/Entry level hires | |
| 662 | Improve Recruiting effectiveness | Sourcing | External hire opportunities | mid-career hires | |
| 663 | Improve Recruiting effectiveness | Sourcing | External hire opportunities | Referrals and other hires | |
| 664 | Improve Recruiting effectiveness | Attraction | Employer Brand | | |
| 665 | Improve Recruiting effectiveness | Attraction | Go to market strategy | | |
| 666 | Improve Recruiting effectiveness | Selection & Placement | Prescreen criteria | Quantitative measures | |
| 667 | Improve Recruiting effectiveness | Selection & Placement | Prescreen criteria | Qualitative | |
| 668 | Improve Recruiting effectiveness | Selection & Placement | Time from app to offer | | |
| 669 | Improve Recruiting effectiveness | Selection & Placement | Interview approach & evaluation | Interview approach | |
| 670 | Improve Recruiting effectiveness | Selection & Placement | Interview approach & evaluation | Offer criteria | |
| 671 | Improve Recruiting effectiveness | Selection & Placement | Matching skill set to role requirements | | |
| 672 | Improve Recruiting effectiveness | Yield on offers and on-boarding | Cultivation method | | |
| 673 | Improve Recruiting effectiveness | Yield on offers and on-boarding | Career development opportunities | | |
| 674 | Improve Recruiting effectiveness | Yield on offers and on-boarding | Initial training for the role | | |
| 675 | Improve Recruiting effectiveness | Yield on offers and on-boarding | Support during transition | Formal Programs | |
| 676 | Improve Recruiting effectiveness | Yield on offers and on-boarding | Support during transition | Informal Programs | |
| 677 | Improve Recruiting effectiveness | Yield on offers and on-boarding | Retention through year 1 | | |
| 678 | Improve individual performance mar | Metrics | Performance Measures | Consistent measures | |
| 679 | Improve individual performance mar | Metrics | Performance Measures | Cross-unit measures | |
| 680 | Improve individual performance mar | Metrics | Performance Measures | Measures that link to opportunity | |
| 681 | Improve individual performance mar | Metrics | Performance targets | Stretch targets | |

402

(Double-Click a record to see details and enter data elements)

Add Driver | Edit Driver

FIG. 4A

| ID | Level 1 | Level 2 | Level 3 | Level 4 | Level 5 |
|---|---|---|---|---|---|
| 681 | Improve individual performance mar | Metrics | Performance targets | Stretch targets | 410 |
| 682 | Improve individual performance mar | Metrics | Performance targets | Cross-unit targets 408 | |
| 683 | Improve individual performance mar | Metrics 404 | Performance targets 406 | Targets that capture opportunity | |
| 684 | Improve individual performance mar | Measurement & Reporting | Rating system | | |
| 685 | Improve individual performance mar | Measurement & Reporting | Evaluation frequency | | |
| 686 | Improve individual performance mar | Measurement & Reporting | Easy to use tools | | |
| 687 | Improve individual performance mar | Measurement & Reporting | Evaluators trained on the system | | |
| 688 | Improve individual performance mar | Measurement & Reporting | Post evaluation performance dialogue | | |
| 689 | Improve individual performance mar | Measurement & Reporting | 360 evaluations | | |
| 690 | Improve individual performance mar | Performance management system ef | Individual performance in role | | |
| 691 | Improve individual performance mar | Performance management system ef | Team contribution | | |
| 692 | Improve return on compensation an | External competitiveness | Financial compensation | Base | |
| 693 | Improve return on compensation an | External competitiveness | Financial compensation | Variable | |
| 694 | Improve return on compensation an | External competitiveness | Non-financial compensation | Perquisites | |
| 695 | Improve return on compensation an | External competitiveness | Non-financial compensation | Recognition Programs | |
| 696 | Improve return on compensation an | External competitiveness | Non-financial compensation | Flexible work arrangements | |
| 697 | Improve return on compensation an | External competitiveness | Benefits | | |
| 698 | Improve return on compensation an | Internal yield of compensation on bu | Blend of compensation | | |
| 699 | Improve return on compensation an | Internal yield of compensation on bu | Range of pay differentiation | | |
| 700 | Improve return on compensation an | Internal yield of compensation on bu | Individual vs team comp. | | |
| 701 | Improve return on compensation an | Internal yield of compensation on bu | Near-term vs long-term comp. | | |
| 702 | Increase effectiveness of training an | Capability assessment | Skills needed | | |
| 703 | Increase effectiveness of training an | Capability assessment | Current level of skill | | |
| 704 | Increase effectiveness of training an | Placement and timing | Selection for training | | |
| 705 | Increase effectiveness of training an | Placement and timing | Timing of offerings | | |
| 706 | Increase effectiveness of training an | Training design | Content quality and relevance | | |
| 707 | Increase effectiveness of training an | Training design | Training delivery method | | |
| 708 | Increase effectiveness of training an | Mentorship & apprenticeship | Formal | | |

402

Add Driver | Edit Driver    (Double-Click a record to see details and enter data elements)

FIG. 4B

| ID | Level 1 | Level 2 | Level 3 | Level 4 | Level 5 |
|---|---|---|---|---|---|
| 708 | Increase effectiveness of training an | Mentorship & apprenticeship | Formal | | |
| 709 | Increase effectiveness of training an | Mentorship & apprenticeship | Informal | | |
| 710 | Increase effectiveness of training an | Career path | Lateral transfers | | |
| 711 | Increase effectiveness of training an | Career path | Vertical growth | | |
| 712 | Increase effectiveness of training an | Career path | Short-term opportunities | | |
| 713 | Improve employee engagement and | Alignment | Understanding of org | Understanding of org goals and strategy | |
| 714 | Improve employee engagement and | Alignment | Understanding of org | Understanding of BU strategy | |
| 715 | Improve employee engagement and | Alignment | Understanding impact of role | Relation of job to business outcomes | |
| 716 | Improve employee engagement and | Alignment | Understanding impact of role | Relation of role to others in the org | |
| 717 | Improve employee engagement and | Connection | Formal | Volunteer opportunities | |
| 718 | Improve employee engagement and | Connection | Formal | Inter-division initiatives | |
| 719 | Improve employee engagement and | Connection | Formal | Inter-division initiatives | |
| 720 | Improve employee engagement and | Connection | Informal (Social network) | Capability-based | |
| 721 | Improve employee engagement and | Connection | Informal (Social network) | Diversity-based | |
| 722 | Improve employee engagement and | Connection | Informal (Social network) | Affinity-based | |
| 723 | Improve employee engagement and | Knowledge management | Access to information | | |
| 724 | Improve employee engagement and | Knowledge management | Access to expertise | | |
| 725 | Capturing value from HR operations | Cost | Labor | Central | COE |
| 726 | Capturing value from HR operations | Cost | Labor | Central | Admin |
| 727 | Capturing value from HR operations | Cost | Labor | Embedded | BU |
| 728 | Capturing value from HR operations | Cost | Non-Labor | Consulting | |
| 729 | Capturing value from HR operations | Cost | Non-Labor | Outsourcing | |
| 730 | Capturing value from HR operations | Cost | Non-Labor | Legal | |
| 731 | Capturing value from HR operations | Cost | Non-Labor | Other | |
| 732 | Capturing value from HR operations | Administration effectiveness | Payroll admin | | |
| 733 | Capturing value from HR operations | Administration effectiveness | Benefits admin | | |
| 734 | Capturing value from HR operations | Administration effectiveness | Recruiting admin | | |
| 735 | Capturing value from HR operations | Administration effectiveness | Other admin | | |

(Double-Click a record to see details and enter data elements)

Add Driver 　　Edit Driver

FIG. 4C

| ID | Level 1 | Level 2 | Level 3 | Level 4 | Level 5 |
|---|---|---|---|---|---|
| 735 | Capturing value from HR operations | Administration effectiveness | Other admin | | |
| 736 | Capturing value from HR operations | Centers of Expertise effectiveness | Compensation | | |
| 737 | Capturing value from HR operations | Centers of Expertise effectiveness | Leadership development | | |
| 738 | Capturing value from HR operations | Centers of Expertise effectiveness | Training and development | | |
| 739 | Capturing value from HR operations | Centers of Expertise effectiveness | HR analytics | | |
| 740 | Capturing value from HR operations | Business partner effectiveness | Retail | | |
| 741 | Capturing value from HR operations | Business partner effectiveness | C&IB | | |
| 742 | Capturing value from HR operations | Business partner effectiveness | PNCI | | |
| 743 | Capturing value from HR operations | Business partner effectiveness | GIS | | |
| 744 | Capturing value from HR operations | Business partner effectiveness | Other | | |
| 745 | Improve organizational design effec | Organizational structure | Span of control | Managerial | |
| 746 | Improve organizational design effec | Organizational structure | Span of control | Front-line | |
| 747 | Improve organizational design effec | Organizational structure | Layers and titles | Job levels / Job families | |
| 748 | Improve organizational design effec | Organizational structure | Layers and titles | Title nomenclature | |
| 749 | Improve organizational design effec | Organizational structure | Layers and titles | Salary ranges / pay scales | |
| 750 | Improve organizational design effec | Organizational structure | Job design | Team vs. Individual | |
| 751 | Improve organizational design effec | Organizational structure | Job design | Autonomy vs. rigidity | |
| 752 | Improve organizational design effec | Systems and tools | HRIS | | |
| 753 | Improve organizational design effec | Systems and tools | Financial | | |
| 754 | Improve organizational design effec | Systems and tools | Risk/Credit | | |
| 755 | Improve organizational design effec | Systems and tools | Marketing/Customer | | |
| 756 | Improve organizational design effec | Systems and tools | Other enterprise-level | | |
| 757 | Improve organizational design effec | Processes | Budget/capital allocation | | |
| 758 | Improve organizational design effec | Processes | People | Recruiting | |
| 759 | Improve organizational design effec | Processes | People | Compensation | |
| 760 | Improve organizational design effec | Processes | People | Performance management | |
| 761 | Improve organizational design effec | Processes | People | Training and development | |
| 762 | Improve organizational design effec | Processes | Strategic planning | | |

(Double-Click a record to see details and enter data elements)

Add Driver    Edit Driver

FIG. 4D

| ID | Level 1 | Level 2 | Level 3 | Level 4 | Level 5 |
|---|---|---|---|---|---|
| 762 | Improve organizational design effec | Processes | Strategic planning | | |
| 763 | Improve organizational design effec | Processes | Risk management | | |
| 764 | Improve HR's value add to the integ | Organization structure | Structure optimization | | |
| 765 | Improve HR's value add to the integ | Organization structure | Standardization of layers and titles | | |
| 766 | Improve HR's value add to the integ | Organization structure | Alignment of accountabilities | | |
| 767 | Improve HR's value add to the integ | HR systems and tools | HRIS | | |
| 768 | Improve HR's value add to the integ | HR systems and tools | Payroll systems | | |
| 769 | Improve HR's value add to the integ | HR systems and tools | Benefits systems | | |
| 770 | Improve HR's value add to the integ | HR systems and tools | Other | | |
| 771 | Improve HR's value add to the integ | Workforce rationalization | Performance Management | | |
| 772 | Improve HR's value add to the integ | Workforce rationalization | Compensation | | |
| 773 | Improve HR's value add to the integ | Workforce rationalization | Training and development | | |
| 774 | Improve HR's value add to the integ | Workforce rationalization | Selection | | |
| 775 | Improve HR's value add to the integ | Values and culture change | Role modeling | | |
| 776 | Improve HR's value add to the integ | Values and culture change | Formal Reinforcement | | |
| 777 | Improve HR's value add to the integ | Values and culture change | Skills | | |
| 778 | Improve HR's value add to the integ | Values and culture change | Communication | | |
| 779 | Improve HR's value add to the integ | Policies | Employee manual | | |
| 780 | Improve HR's value add to the integ | Policies | Integration specifics (e.g. severance) | | |
| 781 | Improve HR's value add to the integ | Policies | Labor relations | | |
| 783 | Capturing value from HR operations | | | | |
| 784 | Increase effectiveness of training an | Trainee | Employee Background | Internal | |
| 789 | Increase effectiveness of training an | Trainee | Employee Background | External | |
| 802 | Increase effectiveness of training an | Trainee | Education / Professional License | Internal | |
| 806 | Increase effectiveness of training an | Trainee | Education / Professional License | External | |
| 817 | Increase effectiveness of training an | Trainee | Relevant professional experience | Internal | |
| 836 | Increase effectiveness of training an | Trainee | Relevant professional experience | External | |
| 843 | Increase effectiveness of training an | Trainee | Selection for training / mentor background | Internal | |

(Double-Click a record to see details and enter data elements)

Add Driver  Edit Driver

| ID | Level 1 | Level 2 | Level 3 | Level 4 | Level 5 |
|---|---|---|---|---|---|
| 779 | Improve HR's value add to the integ | Policies | Employee manual | | |
| 780 | Improve HR's value add to the integ | Policies | Integration specifics (e.g. severance) | | |
| 781 | Improve HR's value add to the integ | Policies | Labor relations | | |
| 783 | Capturing value from HR operations | | | | |
| 784 | Increase effectiveness of training an | Trainee | Employee Background | Internal | |
| 789 | Increase effectiveness of training an | Trainee | Employee Background | External | |
| 802 | Increase effectiveness of training an | Trainee | Education / Professional License | Internal | |
| 806 | Increase effectiveness of training an | Trainee | Education / Professional License | External | |
| 817 | Increase effectiveness of training an | Trainee | Relevant professional experience | Internal | |
| 836 | Increase effectiveness of training an | Trainee | Relevant professional experience | External | |
| 843 | Increase effectiveness of training an | Trainee | Selection for training / mentor background | Internal | |
| 854 | Increase effectiveness of training an | Trainee | Selection for training / mentor background | External | |
| 865 | Increase effectiveness of training an | Trainee | Capabilities Assessment | Internal | |
| 875 | Increase effectiveness of training an | Trainee | Capabilities Assessment | External | |
| 883 | Increase effectiveness of training an | Trainer | Trainer Profile | Internal | |
| 899 | Increase effectiveness of training an | Trainer | Trainer Profile | External | |
| 915 | Increase effectiveness of training an | Trainer | Trainer Experience | Internal | |
| 923 | Increase effectiveness of training an | Trainer | Trainer Experience | External | |
| 931 | Increase effectiveness of training an | Trainer | Survey Feedback on Trainer | Internal | |
| 935 | Increase effectiveness of training an | Trainer | Survey Feedback on Trainer | External | |
| 937 | Increase effectiveness of training an | Trainer | Analysis results on Trainer's Students | Internal | |
| 944 | Increase effectiveness of training an | Trainer | Analysis results on Trainer's Students | External | |
| 951 | Increase effectiveness of training an | Course Content | Course Set up and delivery | Internal | |
| 969 | Increase effectiveness of training an | Course Content | Course Set up and delivery | External | |
| 987 | Increase effectiveness of training an | Course Content | Course test and feedback results | Internal | |
| 992 | Increase effectiveness of training an | Course Content | Course test and feedback results | External | |
| 997 | Increase effectiveness of training an | Analysis | Course Outcomes | Internal | |
| 1003 | Increase effectiveness of training an | Analysis | Course Outcomes | External | |

(Double-Click a record to see details and enter data elements)

Add Driver    Edit Driver

HR Analytics -- Value Driver Data Elements

| Level | | Priority (Y/N) |
|---|---|---|
| Level 1 | Increase effectiveness of training and deve | N |
| Level 2 | Trainee | N |
| Level 3 | Relevant professional experience | N |
| Level 4 | External | N |
| Level 5 | | N |

502

506

| | Data Element | Source System | History | Derived Field? | Dry Operations | |
|---|---|---|---|---|---|---|
| ⚙ | Employment History | Brass Ring | ▷ | N | Show | Derive |
| ⚙ | Does the employee have relevant professional expere | Brass Ring | ▷ | N | Show | Derive |
| ⚙ | Sales Experience | Brass Ring | ▷ | N | Show | Derive |
| ⚙ | Sales - What Company | Brass Ring | ▷ | N | Show | Derive |
| ⚙ | Sales - How many years? | Peoplesoft | ▷ | N | Show | Derive |
| ⚙ | # years in current role | | | | | |
| ⚙ | PNC Location where applicant is being considered for | Peoplesoft | ▷ | N | Show | Derive |

Level 1
Increase effectiveness of training and development

Priority?

Add New Level 1 Driver

Level 2
Trainee

Add New Level 2 Driver

Level 3
Relevant professional experience

Add New Level 3 Driver

Level 4
External

Add New Level 4 Driver

Level 5

Add New Level 5 Driver

Save Record    Delete Record

HR Analytics -- Value Driver Data Elements

| Level 1 | Increase effectiveness of training and deve | Priority (Y/N) N |
|---|---|---|
| Level 2 | Course Content | Priority (Y/N) N |
| Level 3 | Course Set up and delevery | Priority (Y/N) N |
| Level 4 | External | Priority (Y/N) N |
| Level 5 | | Priority (Y/N) N |

| Data Element | Source System | History | Derived Field? | Dry Operations | |
|---|---|---|---|---|---|
| Length of Time | | ▷ | N | Show | Derive |
| Delivery Method | | ▷ | N | Show | Derive |
| Where did the class take place? | | ▷ | N | Show | Derive |
| How many trainees in the class? | | ▷ | N | Show | Derive |
| What is the tenure of each trainee? | | ▷ | N | Show | Derive |
| What is the current position of the trainee? | | ▷ | N | Show | Derive |
| Recent changes to course and business rational to mal | | | | Show | Derive |

Add/Edit Dat...

Select Data Element to Modify years in current role
% of students involuntary turn
% of students promoted within
% of students still with PNC
% of students that meet sales Add New Data Element

FIG. 8A

Add/Edit Dat...

Select Data Element to Modify

Assign Derived Fields

Assign Field Domain Values

Add New Data Element

Add/Edit Dat... ✕

Select Data Element to Modify

Bachelor Concentration
Bachelor Degree
CIQ
CITY
Comp History
Course Knowledge test results
Current & Former Supervisors
Current Position Add New Data Element

FIG. 8D

Add/Edit Dat... ✕

Select Data Element to Modify

% of students that meet sales
% of students that win award(s
% of students that win awards
% of students voluntary turnov
% of students with ACH or EXL
AAYW
ADDRESS
Bachelor Concentration Add New Data Element

FIG. 8C

Add/Edit Dat...

Select Data Element to Modify

- Current Position
- DATE_JOINED
- Dates/Duration of Class
- Define hypothesis for course
- Delivery Method
- Devine Assessment Results
- dfdddddddddddddddddddddd
- Did trainer have any Current/Fo Add New Data Element

Add/Edit Dat...

Select Data Element to Modify

- Did trainer have any Current/Fo
- Does the employee have releva
- EIQ
- Employee Turnover
- Employment History
- Employment screening test resu
- Entry/Mid-Career/Executive Lev
- Expected course outcomes Add New Data Element

FIG. 8F

Add/Edit Dat... ✕

Select Data Element to Modify

- Is there course assessment?
- Is training for Onboarding/Capa
- jyisss
- Knowledge test results
- Language Skills
- Last Name
- Leadership Expereince (College
- Length of Time Add New Data Element

FIG. 8H

Add/Edit Dat... ✕

Select Data Element to Modify

- Expected course outcomes
- First Name
- fsfdfsdfsdf
- How are trainees placed post-tr
- How many trainees in the class
- Is the course required due to le
- Is the employee hired or inherit
- Is there course assessment?

Add New Data Element

Add/Edit Dat... [X]

Select Data Element to Modify

- Numbers of years of school beyo
- Objective of the course
- Other
- Performance Review Results fro
- PNC location
- PNC Location where applicant is
- Post-Program Feedback
- Post-Training Employee Satisfac Add New Data Element

FIG. 8I

Add/Edit Dat... [X]

Select Data Element to Modify

- Length of Time
- Lift of training or change in perf
- Likely to Recommend Survey
- Masters Concentration
- Masters Degree
- mkp
- nnnstststst
- Number of years of school beyo Add New Data Element

FIG. 8K

Add/Edit Dat... [X]

Select Data Element to Modify

- Post-Training Employee Satisfa
- PPID
- Previous Employer
- Prior experience – at PNC
- Prior experience – not at PNC
- Professional Awards
- Professional Certifications
- Professional Licenses Add New Data Element

FIG. 8L

Add/Edit Dat... [X]

Select Data Element to Modify

- Professional Licenses
- Quality of content
- Recent changes to course and t
- Relevance of content
- Retail Market
- S
- Sales – How many years?
- Sales – What Company Add New Data Element

FIG. 8N

Add/Edit Dat...

Select Data Element to Modify

STATE2
Success measures of the course
Tenure at a financial institution
Testing
Testing123
TestingAgainsss
THISISATEST
Time for performance of trainee Add New Data Element

FIG. 8M

Add/Edit Dat...

Select Data Element to Modify

Sales – What Company
Sales Experience
Schools
Self Assessments – Pre/Post Tr
Smile test results
Smile/initial survey results
sssssssssssssssssssssss
STATE2

Add New Data Element

FIG. 8O

Add/Edit Dat... [X]

Select Data Element to Modify

- Time for performance of trainee
- Title(s) at Financial Institution(s
- Total years as trainer
- What courses has he/she taugh
- What is the cost of the training?
- What is the current position of t
- What is the tenure of each train
- What training has he/she had o Add New Data Element

FIG. 8P

Add/Edit Dat... [X]

Select Data Element to Modify

- What training has he/she had o
- When did he/she teach them?
- Where did he/she teach them?
- Where did the class take place?
- WHYIS
- XID
- Years as a PNC Trainer/total ye
- YWWWWWWWWWWWWW Add New Data Element

FIG. 8Q

Add/Edit Dat... [X]

Select Data Element to Modify

- Where did he/she teach them?
- Where did the class take place?
- WHYIS
- XID
- Years as a PNC Trainer/total ye
- YWWWWWWWWWWWWW
- YYTEMP
- ZIP Add New Data Element

US 8,694,541 B1

MAPPING BUSINESS QUESTIONS TO SOURCE SYSTEM DATA ELEMENTS

FIELD OF THE INVENTION

Embodiments of the present invention generally relate to acquiring and applying data necessary to address business questions, requirements, and other related issues. More particularly, in certain embodiments of the invention, data elements may be mapped to various kinds of business questions to assist in the processing of answering the business questions.

BACKGROUND

Firms, companies, financial institutions and other corporate entities expend significant financial resources to understand the questions, issues and requirements that impact the business environment in which they operate.

Calculating a return on investment for various business activities such as employee training can be a speculative exercise under the best of circumstances. For example, trying to understand the business issue of why employee training costs are at a certain level of expense or how to improve the effectiveness of training can be daunting tasks. The data sets necessary to perform these analyses can be difficult or prohibitively costly to obtain, and the collected data may be inaccurate or incomplete. Also, even if such data are available in a digestible format, the data may not reflect the correct or most useful kind of indicators necessary to measure and assess the economic value of human resource activities such as employee training.

In view of the foregoing issues, enhanced systems, processes, tools, techniques and strategies are needed for optimally correlating business requirements or questions with data sets that can be used to properly assess the business questions.

BRIEF DESCRIPTION OF THE FIGURES

The utility of the embodiments of the invention will be readily appreciated and understood from consideration of the following description of the embodiments of the invention when viewed in connection with the accompanying drawings, wherein:

FIGS. 4A through 4F include an example of a data hierarchy structured in accordance with various embodiments of the invention.

FIG. 5 illustrates an example of a data hierarchy structured in accordance with various embodiments of the invention.

FIG. 6 illustrates a tool that can be used to edit or modify various data levels of a data hierarchy structured in accordance with various embodiments of the invention.

FIGS. 7A-7C illustrate an example of the data hierarchy and associated data elements.

FIGS. 8A through 8Q illustrate examples of data elements that can be employed in connection with structuring a data hierarchy and a database in accordance with various embodiments of the invention.

BRIEF SUMMARY OF THE INVENTION

Embodiments of the present invention provide enhanced processes, methods, tools, strategies, and techniques for more effectively and efficiently managing the data needed to assess business questions, requirements, and other issues. Such business questions may involve a wide range of issues facing a business, including human resource requirements such as training and recruiting, for example.

The inventor has recognized that business requirements such as human resource outcomes need to align with other aspects of the business. For example, business questions such as how recruiting affects sales and how training affects sales are important to understand. In addition, how the company knows that employees have the skills necessary for a task like sales, and which skills are more important than others in the sales force are other important considerations. For example, are there different skills for providing customer service, and are there different skills for offering mortgage products? As described below, various embodiments of the present invention may provide a hierarchical framework for analyzing such business questions or requirements.

Information technology specialists may not always prioritize or evaluate data through the lens of business value, and embodiments of the present invention can provide tools to assist in that process of focusing on business priorities. For example, prioritizing data and its impact on business questions can be important when a business leader asks whether an employee for a key role in the company should be hired internally or externally. Various embodiments of the invention can be used to organize and prioritize data to optimize the ability to answer business questions and address business needs. In various embodiments, the present invention may map value driver data elements to business questions to assess which data sets or sources of data are more important than others. This can assist in the process of identifying data elements that will be most useful for assessing different business questions.

DETAILED DESCRIPTION OF THE FIGURES

Figure 1:
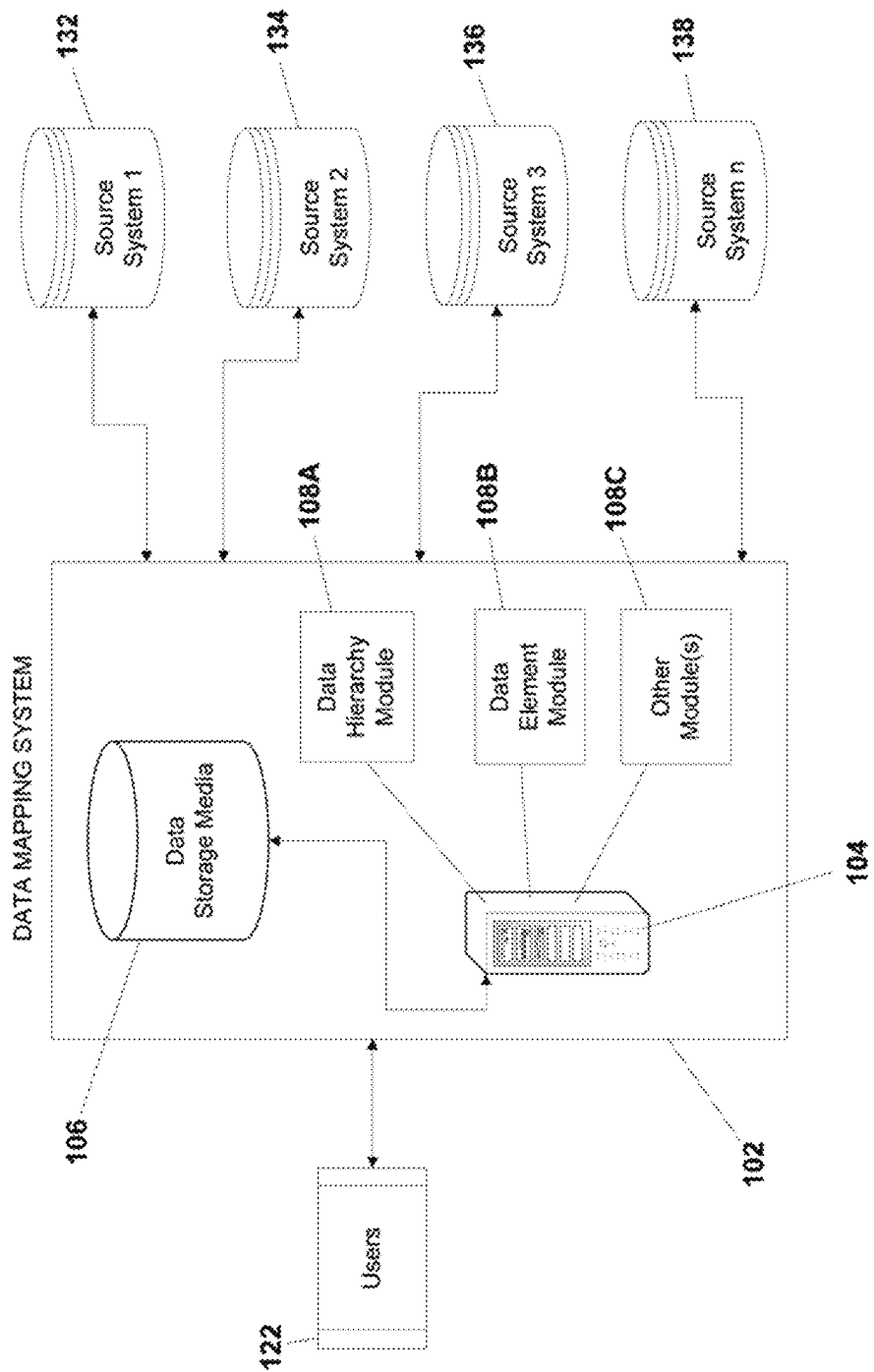
FIG. 1 includes an example of a data mapping system that can be structured and programmed in accordance with embodiments of the invention.

In various embodiments of the invention, strategies, tools and techniques are provided for associating or mapping business questions or other business requirements with data elements that provide insight or answers to the business questions. With regard to FIG. 1, hierarchical data structures can be implemented within a data mapping system 102 structured and programmed in accordance with embodiments of the invention. The data mapping system 102 may be a computer system that includes a processor 104, one or more data storage media 106, and one or more computer program modules 108A-108C that perform various functions within the system 102. For example, a data hierarchy module 108A may allow a variety of users 122 to modify or implement various data hierarchies (as described below). A data element module 108B may be programmed to retrieve or present data elements obtained from one or more source systems 132, 134, 136, 138 operatively associated with the mapping system 102. The source systems 132, 134, 136, 138 may be external or internal computer systems employed by an organization such as a financial institution, for example, or another firm, company, or corporate entity. One or more other modules 108C programmed with instructions to cause the processor 104 to execute various tasks may also be included within the mapping system 102. The data storage media 106 may be used to store data hierarchies, data elements, or output results obtained from the analysis of a business requirement, for example. The data storage media 106 may include one more "Access" databases, for example, or another suitable database structure or software.

Figure 2:
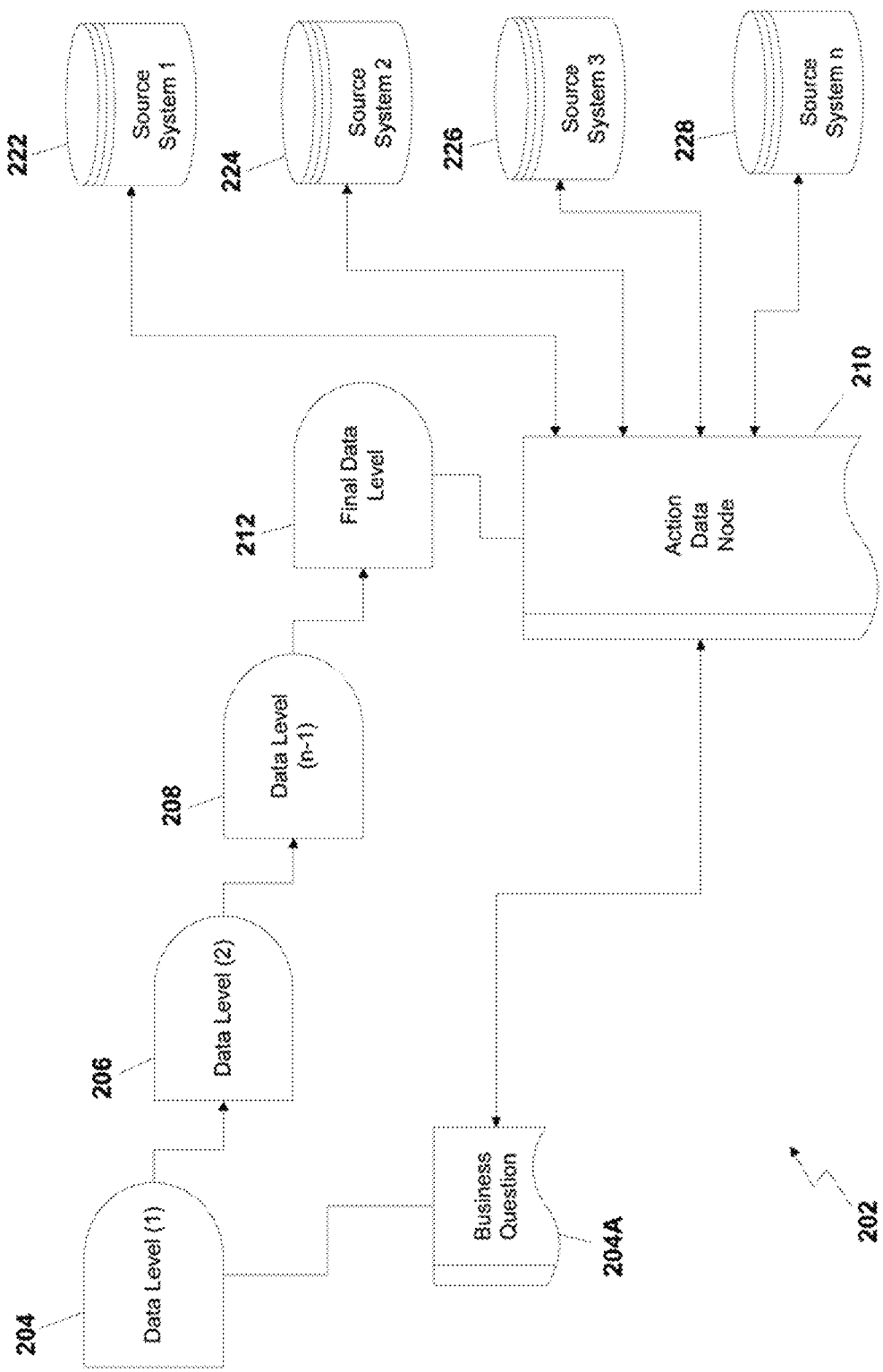
FIG. 2 includes a schematic illustration of an example of a data hierarchy that can be employed in connection with embodiments of the invention.

With reference to FIG. 2, an example of a data hierarchy 202 is schematically illustrated. The data hierarchy 202 may include a first data level 204 in which a business question 204A or requirement of a firm, company, or other institution can be received. Within the data hierarchy 202, a second data level 206 can be connected to the first data level 204. The second data level 206 may be associated with a data factor or data component that at least partially impacts an answer or other resolution to the business requirement specified in the first data level 204. It can be appreciated that there may be multiple other data levels included within the data hierarchy, such as other data levels 208 positioned in the data hierarchy 202 subsequent to the second data level 206, for example. In various embodiments, an action data node 210 can be included within a final data level 212 connected to a preceding data level in the data hierarchy 202.

In the example shown, the final data level 212 is connected to another data level 208 positioned between the second data level 206 and the final data level 212. In various embodiments, the action data node 210 includes one or more data elements associated with a data factor included within the final data level 212. In various embodiments, the data elements may be considered value driver data elements that provide an answer or other insights into the business requirement identified in the first data level 204. In certain embodiments, one or more values for the data elements may be retrieved from a data storage device associated with one or more source systems 222, 224, 226, 228, for example, such as with the processor 104 of the mapping system 102. It can be seen that various embodiments of the invention permit a business requirement to be mapped to various types of data elements that are instructive with regard to assessment of the business requirement.

Figure 3:
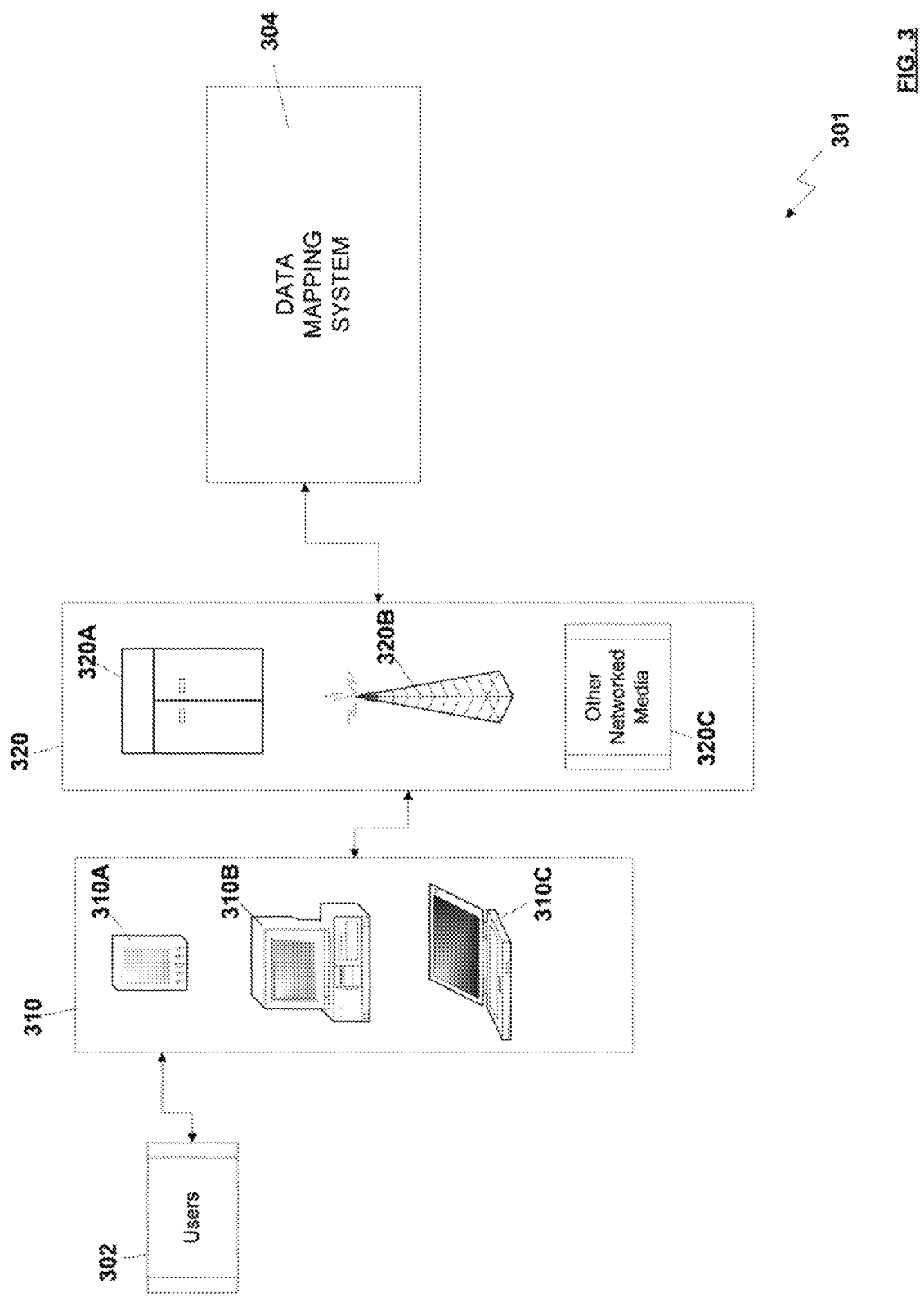
FIG. 3 illustrates an example of a data communication architecture that can be employed in connection with various embodiments of the invention.

FIG. 3 illustrates an example of a data communication architecture 301 through which various kinds of users 302 can communicate, perform tasks, and otherwise interact with a data mapping system 304 structured in accordance with various embodiments of the invention. For example, the users 302 may communicate using a variety of access devices 310, such as network-enabled devices 310A (e.g., wireless phones, smart phones, electronic tablets or pads, and the like); personal computers 310B; or laptop or notebook computers 310C. The access devices 310 can be programmed to communicate with the data mapping system 304 through one or more types of communication media 320. Examples of communication media 320 include wireline networks 320A, wireless networks 320B, or other kinds of networked communication media 320C.

With reference to FIGS. 4A through 8Q (described below), an example of a mapping database is illustrated that can be structured and programmed in accordance with various embodiments of the invention.

In the following examples, an institution may be interested in addressing business questions such as understanding recruiting effectiveness or increasing the effectiveness of an employee trainer. For example, factors to consider in addressing trainer effectiveness could include assessing trainee data, trainer data, course content and analysis, trainer profile, and whether the trainer is internal or external to the institution.

Embodiments of the invention recognize that there may be different levels of business performance in the employee training area as a function of different factors. It can be seen that embodiments of the data hierarchy may also provide a roadmap to the most correct or optimum data elements associated with answering a business question. Embodiments of the invention can be used to assist with assessing such optimization issues. For example, in the context of training, the training team and human resources personnel can be presented with data that support aligning an external trainer (versus an internal trainer) with more seasoned professionals (e.g., who are trying to do new sales or new product invention). Likewise, the data elements may support the proposition that employing an external trainer for new employees (e.g., customer service personnel) will not be as effective as an internal trainer.

With regard to FIGS. 4A through 4F, an example of a data hierarchy is illustrated that can be employed by various embodiments of the data mapping system 102 of the present invention. For example, at ID 660, a business question called "Improve Recruiting Effectiveness" has been entered into a first data level 402 (i.e., "Level 1"). At a second data level 404 (i.e., "Level 2") subsequent to and connected to the first data level 402, it has been recognized that a factor of "Sourcing" impacts the business question of "Improve Recruiting Effectiveness". Furthermore, at a third data level 406 (i.e., "Level 3"), it has been recognized that a data factor of "Internal Hire Opportunities" impacts the "Sourcing" factor of the preceding data level 404, and ultimately is connected to the business question included in the first data level 402. At a final data level 408, a data factor of "Transfers" is included within the action data node of the data hierarchy. Multiple data elements may be associated with the "Transfers" data factor that ultimately assist with addressing the business question of "Improve Recruiting Effectiveness" included in the first data level 402. It can be seen that further data levels, such as data level 410 (i.e., "Level 5"), may also be included within the data hierarchy. This can provide a preview on what data is necessary to answer the business question as well as provide key input to data requirements for information technology teams or other technical teams, for example.

With reference to FIG. 5, an example of the data hierarchy is illustrated for the business question of "Increase Effectiveness of Training and Development" included at a first data level 502. As shown, at a final data level 504 including an "External" data factor various data elements 506 are included at the action data node of the data hierarchy. Each data element 506 can be associated with a source system 508, such as a computer system or data storage location from which the data element has been collected or received. A history field 510 may provide an indication of how the data element 506 has evolved over time and how it has been designated as a value driver data element, for example. A derived field indicator 512 may provide an indication of whether the data element 506 has been derived from a data model, a regression analysis, for example, or whether it has been applied from a source document (e.g., a resume). The screen display of FIG. 6 illustrates a tool that can be used to edit or modify the various data levels of a data hierarchy structured in accordance with various embodiments of the invention.

Figure 7B:
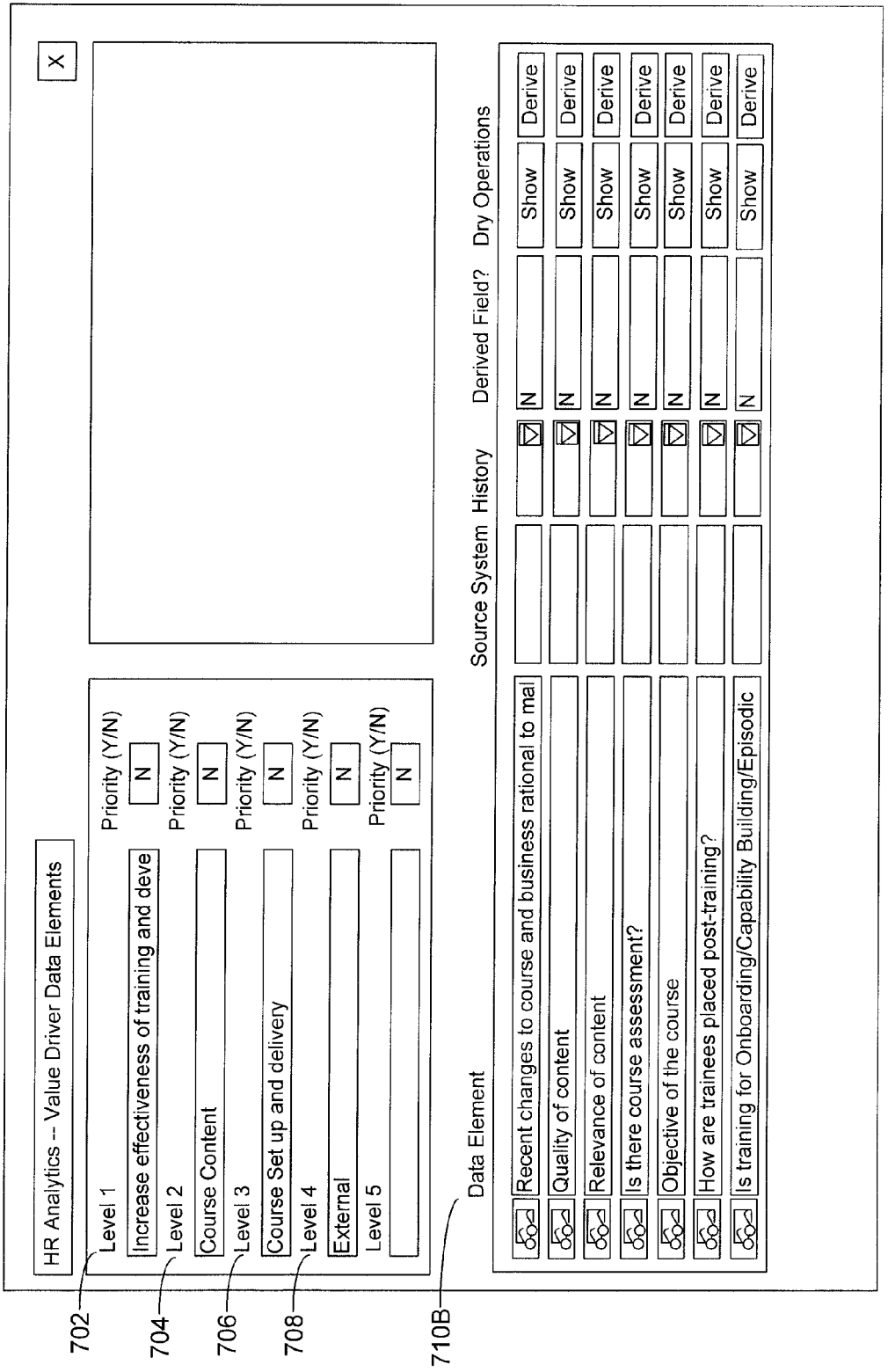
Figure 7C:
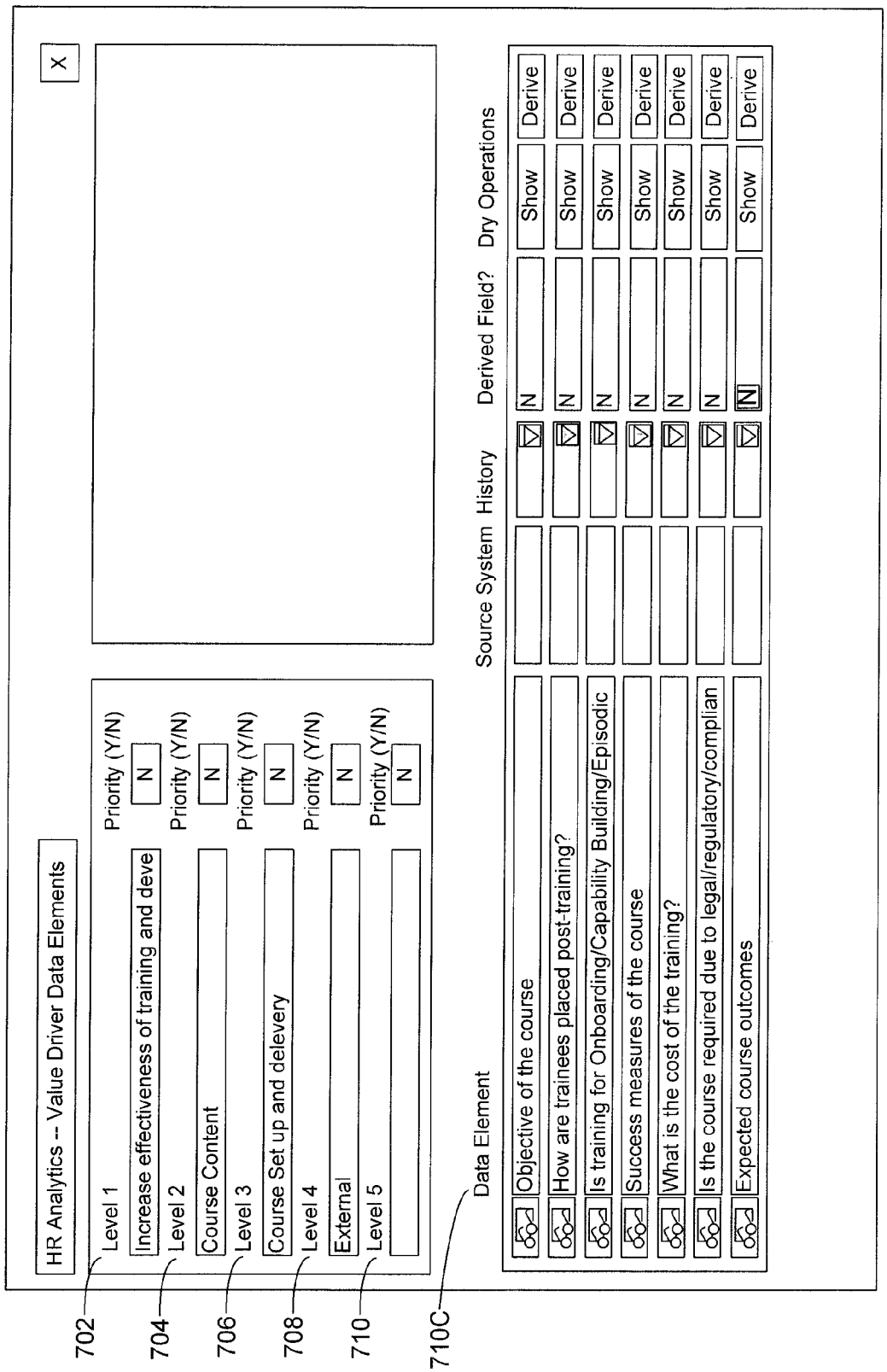

FIGS. 7A-7C illustrate an example of the data hierarchy for the business question of "Increase Effectiveness of Training and Development" at a first data level 702. In this example, the data hierarchy follows a path through data factors of "Course Content" (at a second data level 704), "Course Set Up and Delivery" (at a third data level 706), to a data factor of "External" (at a final data level 708 and action data node for the data hierarchy). In this example, various data elements 710A-710C can be associated with the "External" data factor that may represent value driver data elements for the "Increase Effectiveness of Training and Development" business question. FIGS. 8A through 8Q illustrate examples of data elements that can be employed in connection with structuring a data hierarchy and a database in accordance with various embodiments of the invention.

It can be appreciated that comparing the example shown in FIG. 5 in view of the example shown in FIGS. 7A-7C reveals another useful aspect of certain embodiments of the invention. Each example takes a different path to address the "Increase Effectiveness of Training and Development" business question. It may be useful to compare output results obtained from application of each data hierarchy to identify which hierarchy and/or which data elements offered the best insight into the answer to the business question. Accordingly, embodiments of the invention can be employed to facilitate comparisons of the results of different data hierarchies to identify optimum data elements and to apportion resources appropriately when acquiring those optimum data elements.

Those skilled in the art can appreciate that embodiments of the present invention can provide a tool for answering business questions while identifying the best or most correct data to address the questions. This can be especially useful when deciding how to allocate resources necessary to retrieve and process the desired data elements. For example, certain data sets that have greater predictive power can be ranked or prioritized over other data sets that have less capability to address business questions. Also, business considerations such as return on investment, risk management, and many others can be employed in connection with the process of prioritizing the data elements and how to collect data.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. For example, no particular aspect or aspects of the examples of system architectures, user interface layouts, or screen displays described herein are necessarily intended to limit the scope of the invention.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these sorts of focused discussions would not facilitate a better understanding of the present invention, and therefore, a more detailed description of such elements is not provided herein.

Any element expressed herein as a means for performing a specified function is intended to encompass any way of performing that function including, for example, a combination of elements that performs that function. Furthermore the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention.

Moreover, the processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "host," "engine," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET, SQL, MySQL, or HTML using, for example, conventional or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. The network may use routers and/or public communication links. One type of data communication network may cover a relatively broad geographic area (e.g., city-to-city or country-to-country) which uses transmission facilities provided by common carriers, such as telephone service providers. In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods and systems described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java). Also, application servers may be provided in accordance with the .NET framework, including the Windows Communication Foundation, .NET Remoting, ADO-.NET, and ASP.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

In various embodiments, computers and computer systems described herein may have the following main components: arithmetic and logic unit (ALU), control unit, memory, and input and output devices (I/O devices). These components can be interconnected by busses, often comprising groups of wires or cables. The control unit, ALU, registers, and basic I/O (and often other hardware closely linked with these sections) can be collectively considered a central processing unit (CPU) for the computer system. The CPU may be constructed on a single integrated circuit or microprocessor.

The control unit (control system or central controller) directs the various components of a computer system. The control system decodes each instruction in a computer program and turns it into a series of control signals that operate other components of the computer system. To enhance performance or efficiency of operation, the control system may alter the order of instructions. One component of the control unit is the program counter, a memory register that tracks the location in memory from which the next instruction is to be read.

The ALU is capable of performing arithmetic and logic operations. The set of arithmetic operations that a particular ALU supports may be limited to adding and subtracting or might include multiplying or dividing, trigonometry functions (sine, cosine, etc.) and square roots. Some may be programmed to operate on whole numbers (integers), while others use floating point to represent real numbers, for example. An ALU may also compare numbers and return Boolean truth values (e.g., true or false). Superscalar computers may contain multiple ALUs to facilitate processing multiple instructions at the same time. For example, graphics processors and computers with SIMD and MIMD features often possess ALUs that can perform arithmetic operations on vectors and matrices. Certain computer systems may include one or more RAM cache memories configured to move more frequently needed data into the cache automatically.

Examples of peripherals that may be used in connection with certain embodiments of the invention include input/output devices such as keyboards, mice, screen displays, monitors, printers, hard disk drives, floppy disk drives, joysticks, and image scanners.

Embodiments of the methods and systems described herein may divide functions between separate CPUs, creating a multiprocessing configuration. For example, multiprocessor and multi-core (multiple CPUs on a single integrated circuit) computer systems with co-processing capabilities may be employed. Also, multitasking may be employed as a computer processing technique to handle simultaneous execution of multiple computer programs.

In various embodiments, the computer systems, data storage media, or modules described herein may be configured and/or programmed to include one or more of the above-described electronic, computer-based elements and components, or computer architecture. For example, the data mapping system or the data hierarchy structure may employ such components or architecture. Also, it is contemplated that various users of the data mapping system may interact or communicate with the system in a variety of ways. In addition, these elements and components may be particularly configured to execute the various rules, algorithms, programs, processes, and method steps described herein.

While various embodiments of the invention have been described herein, it should be apparent, however, that various modifications, alterations and adaptations to those embodiments may occur to persons skilled in the art with the attainment of some or all of the advantages of the present invention. The disclosed embodiments are therefore intended to include all such modifications, alterations and adaptations without departing from the scope and spirit of the present invention as set forth in the appended claims.

What is claimed is:
1. A system for addressing a business question, the system comprising:
a data mapping system including an electronic processor and at least one data storage medium, the data mapping system programmed for:
receiving a business question at a first data level of a data storage hierarchy from an access device associated with a user;
generating a second data level connected to the first data level, wherein the second data level includes a data factor that at least partially impacts an answer to the business question in the first data level;
generating a first action data node included within a first final data level connected to a preceding data level in the data storage hierarchy, wherein the first final data level includes a data factor that is related to a data factor in a preceding level of the data storage hierarchy, wherein the first action data node includes at least one first data element associated with the data factor in the first final data level;
retrieving values for the data elements included within the first action data node from a non-transitory data storage device associated with at least one source system;

providing the first data level, the second data level connected to the first data level, and the first final data level connected to a preceding data level such that at least one of the first data level, the second data level, and the first final data level is editable; and providing a derived field indicator corresponding to the at least one first data element associated with the data factor in the first final data level that is related to a data factor in the preceding level of the data storage hierarchy, the derived field indicator indicating whether the at least one first data element has been derived from at least one of a data model, a regression analysis, and a source document;

generating a third data level connected to the first data level, wherein the third data level includes a data factor that at least partially impacts an answer to the business question in the first data level;

generating a second action data node included within a second final data level connected to the third data level in the data storage hierarchy, wherein the second final data level includes a data factor that is related to a data factor in the third data level of the data hierarchy, wherein the second action data node includes at least one second data element associated with the data factor in the second final data level;

retrieving a value for the at least one second data element included within the second action data node from the non-transitory data storage device associated with the at least one source system;

providing the first data level, the second data level, the third data level, the first final data level, and the second final data level such that at least one of the first data level, the second data level, the third data level, the first final data level, and the second final data level is editable;

providing a second derived field indicator corresponding to the at least one second data element associated with the data factor in the second final data level, the second derived field indicator indicating whether the at least one second data element has been derived from at least one of a data model, a regression analysis, and a source document;

comparing the values corresponding to the data elements included within the first action data node to the values for the data elements included within the second action data node; and ranking the data elements included within the first action data node and the values for the data elements included within the second action data node based on capability to address the business question.

2. The system of claim 1, wherein the data mapping system is further programmed for mapping the data elements included within the first action data node to the business question in the first data level of the data hierarchy.

3. The system of claim 1, wherein the data mapping system is further programmed for retrieving one or more of the data elements from a plurality of source systems.

4. The system of claim 1, wherein the business question includes a human resources requirement.

5. The system of claim 1, wherein the data mapping system is further programmed for associating each data element with a source system.

6. The system of claim 5, wherein associating each data element with a source system includes associating a data storage location for each data element.

7. The system of claim 5, wherein associating each data element with a source system includes associating a computer system with each data element.

8. The system of claim 1, wherein the data mapping system is further programmed for associating each data element with a history field.

9. The system of claim 8, wherein the history field provides an indication of how each data element has evolved over time.

10. The system of claim 8, wherein the history field provides an indication of how each data element has been designated as a value driver data element.

11. The system of claim 1, wherein the data mapping system is further programmed for associating each data element with a derived field indicator.

12. The system of claim 11, wherein the derived field indicator provides an indication of whether each data element has been derived from a data model.

13. The system of claim 11, wherein the derived field indicator provides an indication of whether each data element has been derived from a regression analysis.

14. The system of claim 11, wherein the derived field indicator provides an indication of whether each data element has been derived from a source document.

* * * * *